United States Patent

Manificat et al.

[11] Patent Number: 5,862,678
[45] Date of Patent: Jan. 26, 1999

[54] METHOD AND DEVICE FOR PRODUCING AND SEPARATING SOLID PARTICLES

[75] Inventors: André Manificat, Grenoble; Jean-Paul Petit-Perrin, Saint-Didier-au-Mont-d'Or; Bernard Chiello, Vaulx-en-Velin, all of France

[73] Assignee: Commissariat a l'Energie Atomique, Paris, France

[21] Appl. No.: 860,651

[22] PCT Filed: Feb. 2, 1996

[86] PCT No.: PCT/FR96/00182

§ 371 Date: Jul. 24, 1997

§ 102(e) Date: Jul. 24, 1997

[87] PCT Pub. No.: WO96/24017

PCT Pub. Date: Aug. 8, 1996

[30] Foreign Application Priority Data

Feb. 3, 1995 [FR] France .................................. 95 01471

[51] Int. Cl.[6] ..................................................... F25D 17/02
[52] U.S. Cl. .............................................. 62/347; 62/374
[58] Field of Search ................. 62/74, 347, 64, 62/374–376

[56] References Cited

U.S. PATENT DOCUMENTS

| 3,313,032 | 4/1967 | Malecki ..................................... 62/347 |
| 3,427,816 | 2/1969 | Hanny et al. ............................. 62/347 |
| 3,670,520 | 6/1972 | Bontelli ..................................... 62/347 |
| 4,655,047 | 4/1987 | Temple et al. .............................. 62/74 |
| 4,754,610 | 7/1988 | Knodel et al. .............................. 62/74 |

FOREIGN PATENT DOCUMENTS

| 2630668 | 4/1988 | France . |
| 2805676 | 2/1978 | Germany . |
| 1376972 | 12/1974 | United Kingdom . |
| 8910522 | 11/1989 | WIPO . |

Primary Examiner—William E. Tapolcai
Attorney, Agent, or Firm—Dowell & Dowell, P.C.

[57] ABSTRACT

The device for implementing the method comprises a receptacle (3) whose internal profile has the shape of an asymmetric cone (3d) inside which is arranged a blade (5b) of an agitator (5) to agitate with a slow motion the bath of refrigerating liquid contained in the receptacle (3), an orifice (3i) being provided at the bottom of the cone (3d) and communicating with a pipe (3j) wherein is rotationally driven an Archimedean screw (6b) of an extractor device (6) to evacuate continuously the solid particles.

11 Claims, 2 Drawing Sheets

METHOD AND DEVICE FOR PRODUCING AND SEPARATING SOLID PARTICLES

BACKGROUND OF THE INVENTION

1. Field of the Invention

The present invention relates to a method and device for the production of solid particles from a liquid and the separation of solid particles contained in a bath of refrigerating liquid. The method of producing and separating solid particles is intended for example for obtaining balls of ice for surface cleaning by projection of the particles, or for constituting solid products from aqueous mixture. Finally, the method of production and separation is provided for obtaining solid particles from liquids of which the latent heat of solidification is less than that of pure water.

2. History of the Related Art

French Patent 2 630 668 discloses a method and a device for producing balls of ice for surface treatments. The method consists in dispersing by gravity a spectrum of droplets of water in a column of cold gas, so that the droplets of water pass through said column of cold gas by gravity and cool, solidifyig superficially before dropping in a bath of refrigerating liquid where they are solidified entirely in the form of balls of ice. The device for carrying out the method comprises an exchange column supplied with cold gas and droplets of water which are regularly distributed via an injector to create a spectrum of droplets. The device also comprises a receptacle secured to the exchange column comprising a spray pipe for feeding the refrigerating liquid, a cone for receiving the balls of ice and an orifice for evacuating the balls of ice at the bottom of the cone.

The receptacle has a cylindro-conical form in which a refrigerating liquid such as liquid nitrogen is introduced with a view to completely solidifyig the droplets of water which pass therethough.

A phenomenon of heating will be noted, when the partially solidified droplets of water reach, at the end of their free fall, the surface of the refrigerating liquid, said phenomenon due to the evaporation of the liquid nitrogen. The phenomenon of heating retains each ball of ice in lift until it has attained the temperature of the gaseous nitrogen coming from the change of phase of the liquid nitrogen.

It will be noted that it is only after complete solidification of the ball of ice that it starts its descent by gravity to the bottom of the cylindro-conical receptacle the phenomenon of heating also provokes a high rate of occupation of the surface of the bath of liquid nitrogen, risking constituting either out-of-calibre balls or agglomerates which are highly detrimental to the manufacture of the balls of ice and to the extraction thereof at the Archimedean screw.

A second phenomenon which is detrimental in the manufacture of the balls of ice is noted, which is induced by the slight difference in density between the ice at −196° and that of the liquid nitrogen, viz. respectively about 0.850 and 0.8068. The slight difference in density influences the dynamics of descent by gravity of the balls of ice, hence a strong tendency to constitute agglomerates at the surface of the bath of liquid nitrogen.

DE-A-2 805 676 discloses a method and a device for producing solid balls comprising a supply of cold gas, an agitator with blade, a receptacle and an Archimedean screw belonging to an extraction device. In this device, the movement of the liquid in the bottom of the receptacle is not directed downwardly, this resulting in risks of turbulences and choking.

SUMMARY OF THE INVENTION

It is a more particular object of tile invention to overcome these drawbacks, by proposing a method and a device in which the circulation of the balls towards the extraction device is facilitated.

In this spirit, the invention relates to a method for producing and extracting solid particles in the form of balls consists in dispersing by gravity a spectrum of droplets of particles in a column of cold gas, so that the droplets pass through said cold gas column by gravity and cool, solidifyig superficially before falling into a bath of refrigerating liquid, and in continuously extracting the balls from the bath of refrigerating liquid, characterized in that it future consists in displacing the bath of refrigerating liquid in a slow movement in the sense of a vortex in a cone of asymmetrical profile constituted by an assembly of inclined walls shaped to produce two distinct zones of progressive and different inclination, so as to create a wave whose forces are directed downwardly in order to allow descent of the droplets of particles so that they solidify entirely in the form of balls.

The invention also relates to a device for carrying out the method and more specifically, a device for producing and extracting solid particles in the form of balls, of the type comprising an exchange column supplied with cold gas, an injector of particles to be solidified and a receptacle supporting the column and whose bottom comprises an orifice for evacuating the solidified particles in the form of balls, said orifice communicating with a pipe in which is rotated an Archimedean screw of an extraction device for continuously evacuating the solid particles, characterized in that said bottom has the form of a cone of asymmetrical profile constituted by an assembly of inclined walls shaped to produce two distinct zones of progressive and different inclinations, a blade of an agitator being introduced inside said asymmetrical cone to displace, in a slow movement, a bath of refrigerating liquid contained in the receptacle.

BRIEF DESCRIPTION OF THE DRAWINGS

The accompanying drawings, given by way of example, will enable the invention, the characteristics that it presents and the advantages that it is capable of procuring, to be more readily understood.

DESCRIPTION OF THE PREFERRED EMBODIMENT

Figure 1:
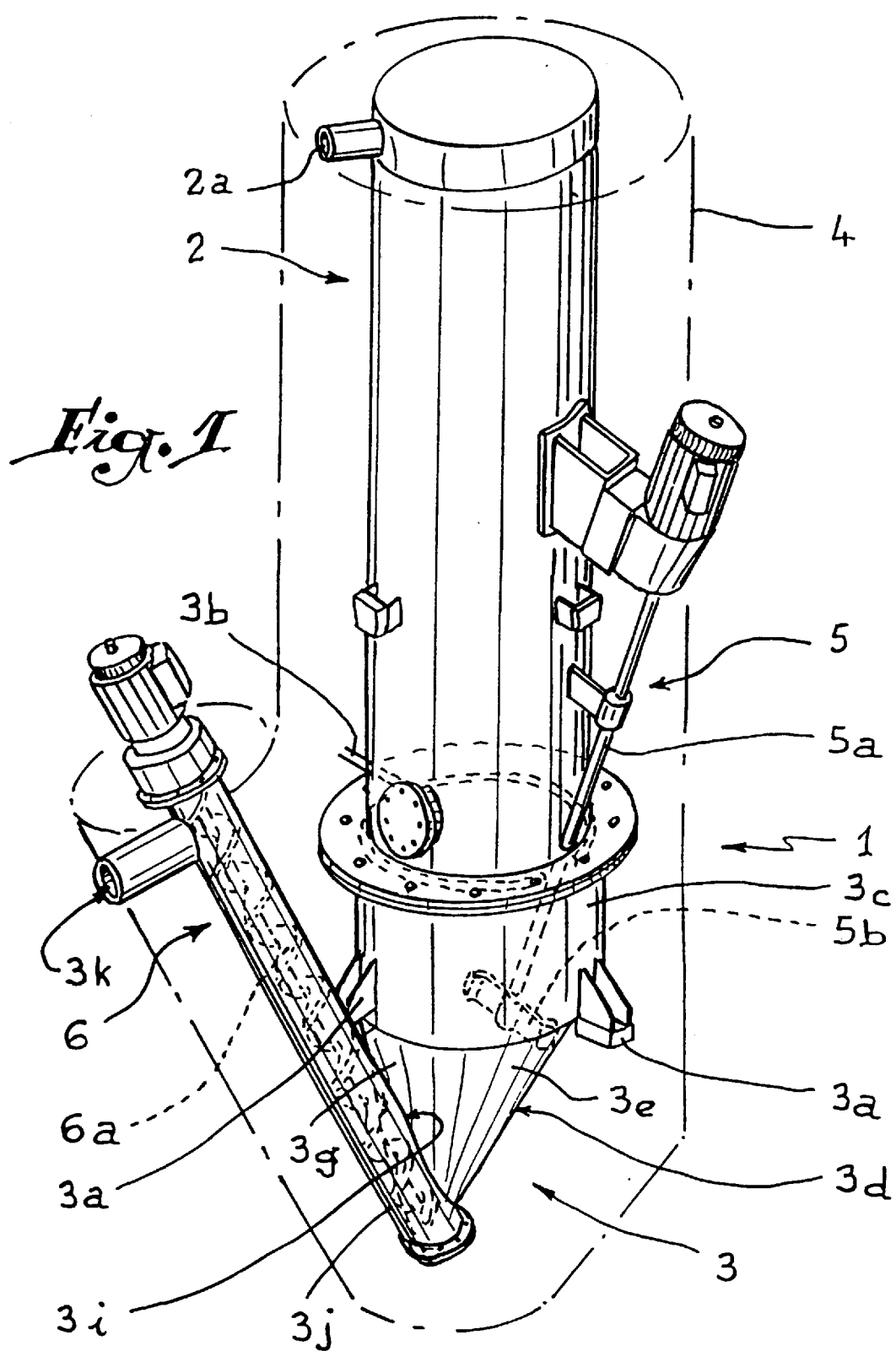
FIG. 1 is a view in perspective illustrating the device according to the invention for carrying out the method of producing and extracting solid particles.

FIG. 1 shows a device 1 for producing and extracting solid particles, comprising an exchange column 2 mounted to its lower part with a receptacle 3 which abuts by means of brackets 3a on a chassis (not shown). The whole of the device 1 is made of stainless steel enveloped in an insulating material 4 such as polyurethane, shown in dashed and dotted lines.

The exchange column 2 is shaped like the one described in French Patent 2 630 668, with the result that it comprises, towards it upper end, i.e. opposite the receptacle 3, the inlet of an injector 2a. This injector is provided with a large number of holes trough which the spectrum of droplets intended to produce the balls of solid particles is formed.

The diameter of the droplets of particles may be adjusted as a function of the diameter of the holes.

The exchange column 2 also supports an agitator 5 whose shaft 5a is secured to a blade 5b which is placed inside the receptacle 3.

Figure 2:
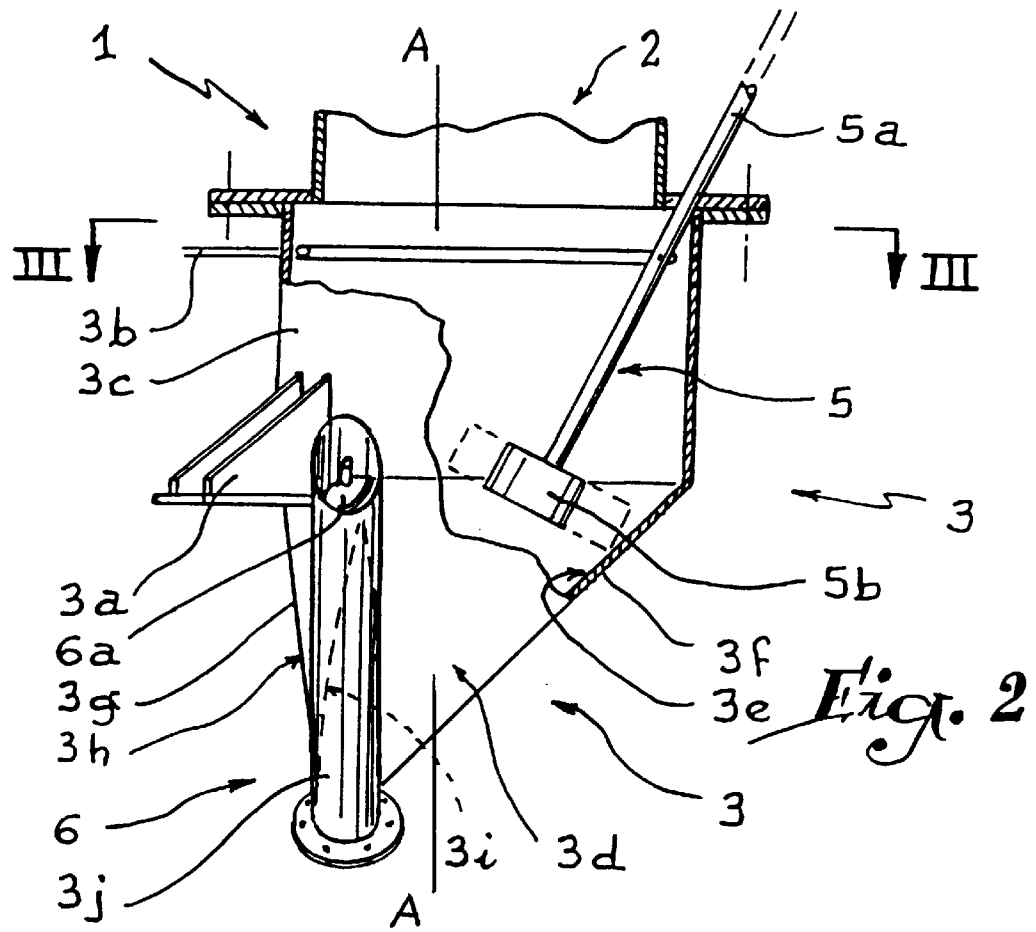
FIG. 2 is a schematic section showing the receptacle of the device for producing/extracting solid particles.
Figure 3:
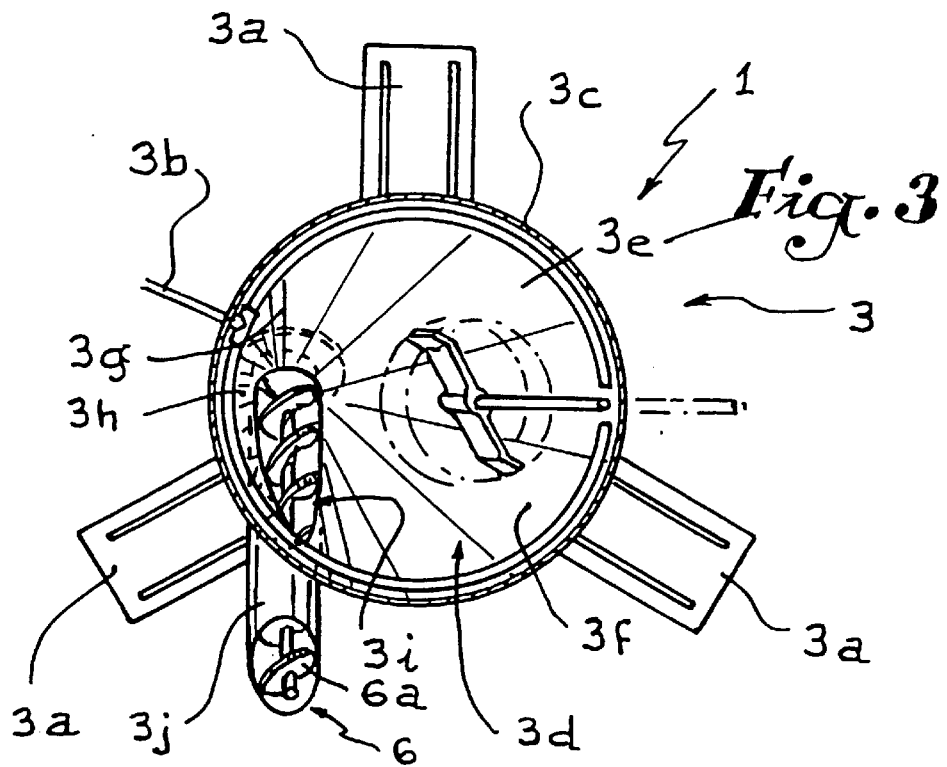
FIG. 3 is a plan view along III—III of FIG. 2, showing the profile of the receptacle in the form of an asymmetrical cone.

The receptacle 3 has a spray pipe 3b arranged just below the level of fixation of the exchange column 2 to feed the refrigerating liquid inside the device 1. The spray pipe 3b is pierced with a multitude of holes to diffuse the refrigerating liquid which is constituted for example by liquid nitrogen. It will be noted that the spray pipe 3b has the form of a C in order to constitute inside the receptacle 3 a passage for the drive shaft 5a of the agitator 5 (FIGS. 2 and 3).

The receptacle 3 has in its upper part a cylindrical profile 3c extending to the exchange column 2 and inside which is placed the injection spray pipe 3b. The cylindrical profile 3c extends, to form the lower part of the receptacle 3, in an asymmetrical cone 3d (FIG. 2).

The asymmetrical cone 3d is constituted by an assembly of inclined walls which are shaped to produce two distinct zones of progressive and different inclinations. The first zone 3e comprises a plurality of walls assembled on one another, of which at least the end one 3f is inclined by an angle included between 40° and 45° with respect to the vertical axis (A—A) of the cone 3d. On the other hand, the second zone 3g extending from the first comprises a plurality of walls of which at least the end one 3h is inclined by an angle included between 3° and 10° with respect to the vertical axis of the cone 3d (FIGS. 2 and 3).

It will be noted that the variation in the inclination of the walls constituting the first zone 3e must be sufficient to allow the blade 5b of the agitator 5 to be placed in position.

The asymmetrical cone 3d comprises in its lower part an orifice 3i located in the vicinity of the wall 3h of the second zone 3g, i.e. offset laterally with respect to the principal axes locating the widest base of the cone 3d. The orifice 3i opens out in an inclined pipe 3j extending upwardly and in which is rotated an Archimedean screw 6a of an extraction device 6 for continuously evacuating the solid particles located in the bottom of the asymmetrical cone 3d.

The pipe 3j comprises in its upper part a spout 3k of cylindrical profile for evacuating the balls of solid particles inside a sealed container for conserving the balls.

It is observed that the pipe 3j is arranged in a vertical plane substantially perpendicular to that containing the drive shaft 5a of the agitator 5.

Operation of the device for producing the solid particles is identical to that described in French Patent 2 630 668. In fact, the injector 2e disperses at the top of the exchange column 2 a spectrum of droplets of liquid particles falling by gravity in the exchange column. Upon direct contact of the cold gas, the droplets freeze partially. They fall by gravity in the exchange column 2 and thus drop in the bath of refrigerating liquid located in the asymmetrical cone 3d of the receptacle 3 where they solidify completely.

The wide, flat blade 5b of the agitator 5 provokes a slow movement of the bath of liquid nitrogen in the sense of a vortex. This movement, associated with the shape of the asymmetrical cone 3d, makes it possible to create a wave whose forces are directed downwardly. The orifice 3i is positioned with respect to the point of convergence of the forces mentioned above in order to accelerate extraction of the solid particles located at the bottom of the cone 3d by means of device 6.

It will be noted that the speed of rotation, which is slow and fairly precise, of the blade 5b, avoids a turbulent breaking of the wave against the walls of the asymmetrical cone 3d. Under these conditions, it is ascertained that the consumption of liquid nitrogen is very close to the theoretical one.

It will be noted that the solid particles pass through the bath of liquid nitrogen in quite satisfactory manner without creating any choking at the level of the surface of said bath of liquid nitrogen. In fact, as soon as the particles in the course of solidification arrive on the surface of the bath of nitrogen, said particles are directly entrained by the wave effect of said bath so that they pass therethrough as far as the orifice 3i of the asymmetrical cone 3d.

It will be noted that the solid particles may be constituted from any aqueous mixture of any liquid of which the latent heat of solidification is less than that of pure water.

Moreover, it must be understood that the foregoing description has been given only by way of example and that it in no way limits the domain of the invention which would not be exceeded by replacing the details of execution described by any other equivalents.

We claim:

1. In a device for producing and extracting solid particles which includes a heat exchange column adapted to be supplied with a cold gas and which is mounted to a receptacle which is adapted to retain a bath of refrigerant liquid, and which device further includes and injector adapted to introduce particles to be solidified into the heat exchange column, the improvement comprising; the receptacle having a lower portion in a configuration of a cone of asymmetrical profile including a first wall portion inclined at a first acute angle relative to a vertical axis of the device and a second wall portion inclined at a second acute angle relative to the vertical axis of the device which second angle is less than said first angle, an outlet opening in said lower portion of the receptacle which communicates with a means for conveying solid particles from said lower portion of the receptacle, means for agitating a bath of refrigerant fluid within the receptacle, and said means for agitating being oriented within said lower portion of the receptacle and relative to said outlet opening and said first and second wall portions so as to direct solid particles directly through a bath of refrigerant liquid within said lower portion of the receptacle toward said outlet opening.

2. The device of claim 1 wherein the receptacle includes an upper cylindrical portion which extends from said lower portion toward the heat exchange column.

3. The device of claim 2 wherein said means for agitating includes a blade disposed in said lower portion of the receptacle and being driven by a drive shaft which extends outwardly of said receptacle at an angle relative to said axis.

4. The device of claim 3 wherein said outlet opening communicates with a pipe in which said means for conveying is housed.

5. The device of claim 4 wherein said pipe extends generally perpendicularly relative to said drive shaft of said blade.

6. The device of claim 5 including a refrigerant feed spray pipe extending in a "C" configuration within said upper portion of the receptacle whereby said drive shaft may extend through a passage defined by said "C" configuration of said spray pipe.

7. The device of claim 1 in which said first wall portion includes an assembly of walls inclined at said first acute angle at between 40° and 45° with respect to said axis.

8. The device of claim 7 wherein said second wall portion includes an assembly of walls inclined at said second acute angle at between 5° and 10° with respect to said axis.

9. The device of claim 1 wherein said outlet opening extends through at least a portion of said second wall portion of said lower portion of the receptacle.

10. The device of claim 1 wherein said means for agitating includes a blade which extends into said lower portion of said receptacle.

11. The device of claim 1 in which said means for agitating is mounted adjacent said first wall portion of said lower portion of the said receptacle.

* * * * *